Dec. 4, 1934.   E. A. LINK, JR   1,982,960
ILLUMINATED AERIAL DISPLAY
Filed April 27, 1934   12 Sheets-Sheet 1
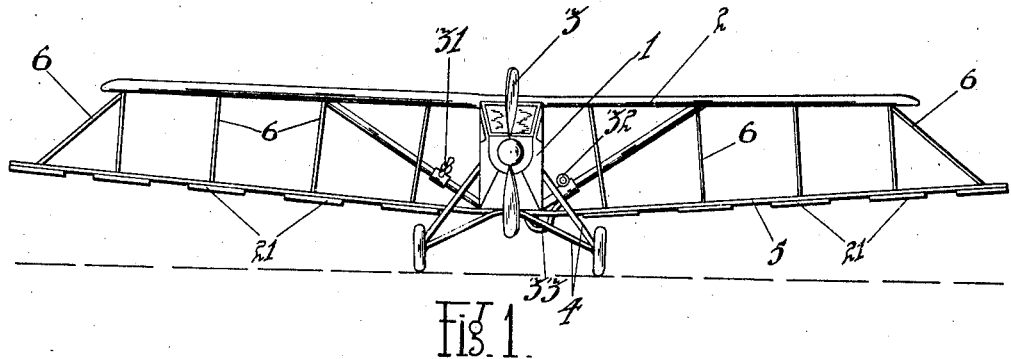
Fig.1.
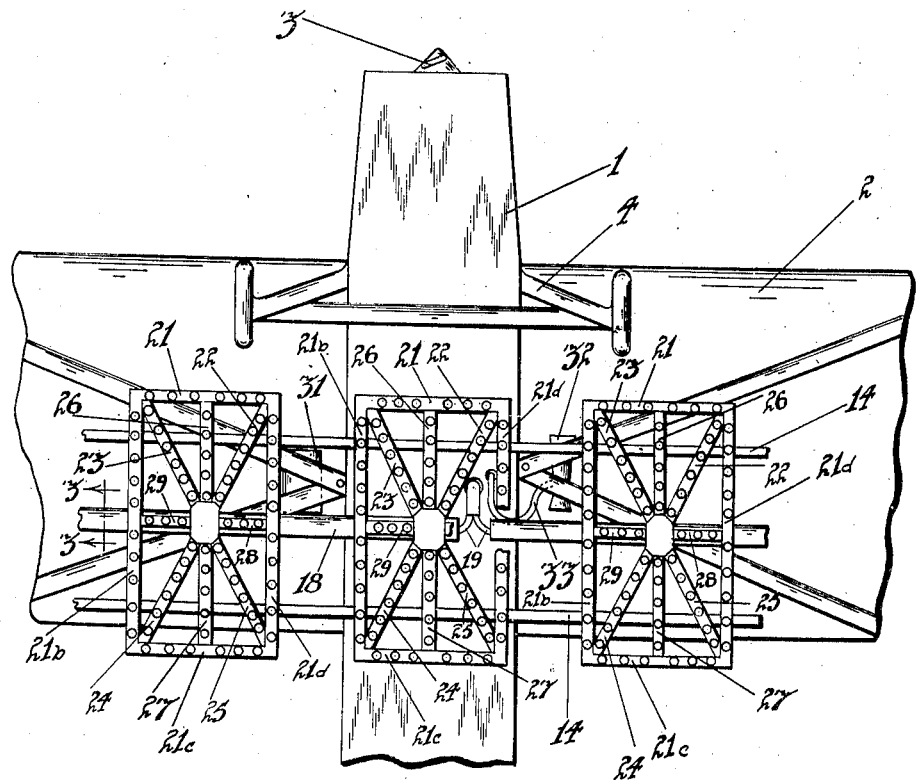
Fig.2.
Fig.3.
INVENTOR.
EDWIN A. LINK, JR.
BY
ATTORNEY.

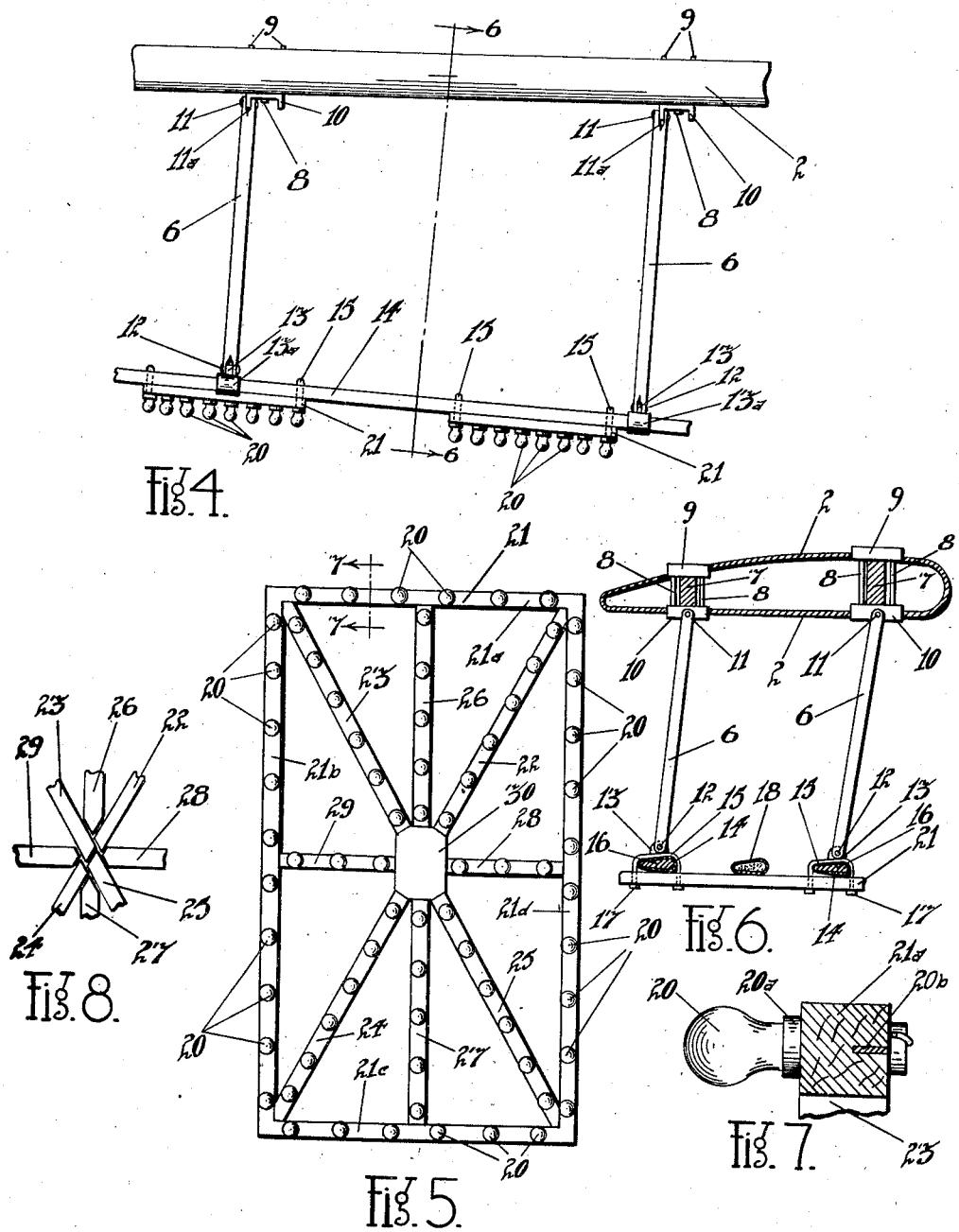

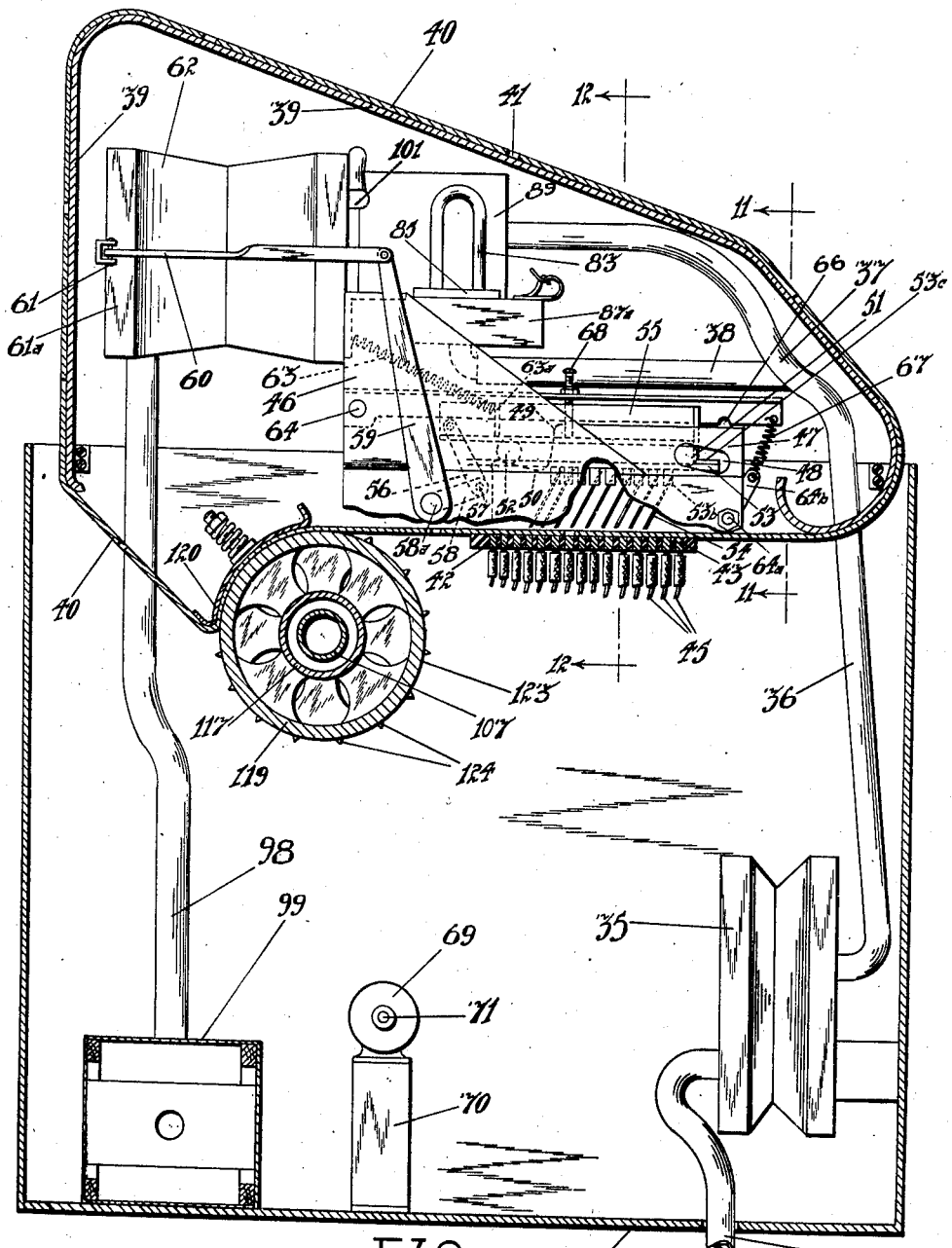

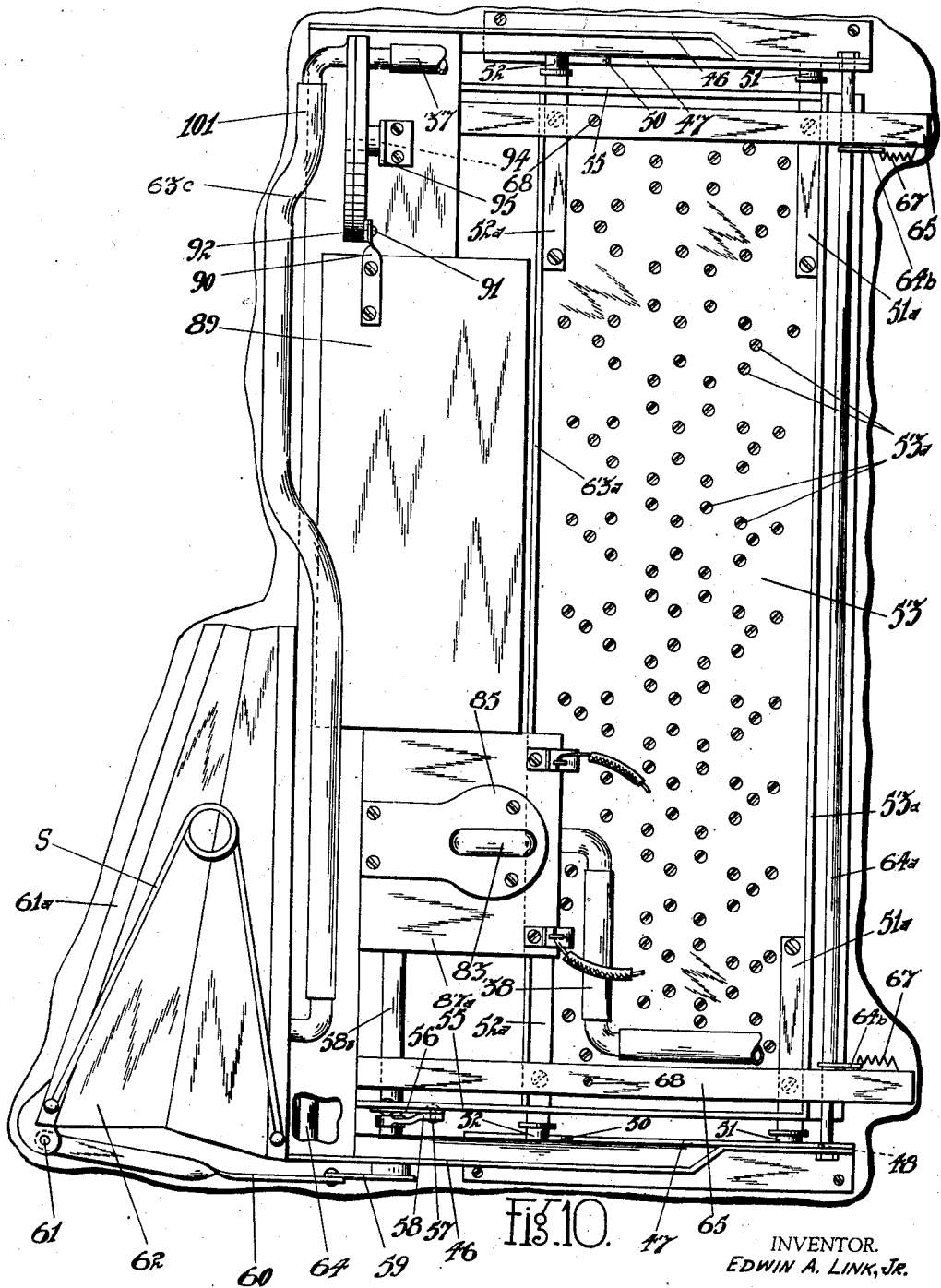

Dec. 4, 1934.                E. A. LINK, JR                1,982,960
                        ILLUMINATED AERIAL DISPLAY
                          Filed April 27, 1934         12 Sheets-Sheet 5

INVENTOR.
EDWIN A. LINK, JR.
BY
Philip S. Hopkins
ATTORNEY.

Dec. 4, 1934.  E. A. LINK, JR  1,982,960
ILLUMINATED AERIAL DISPLAY
Filed April 27, 1934  12 Sheets-Sheet 6
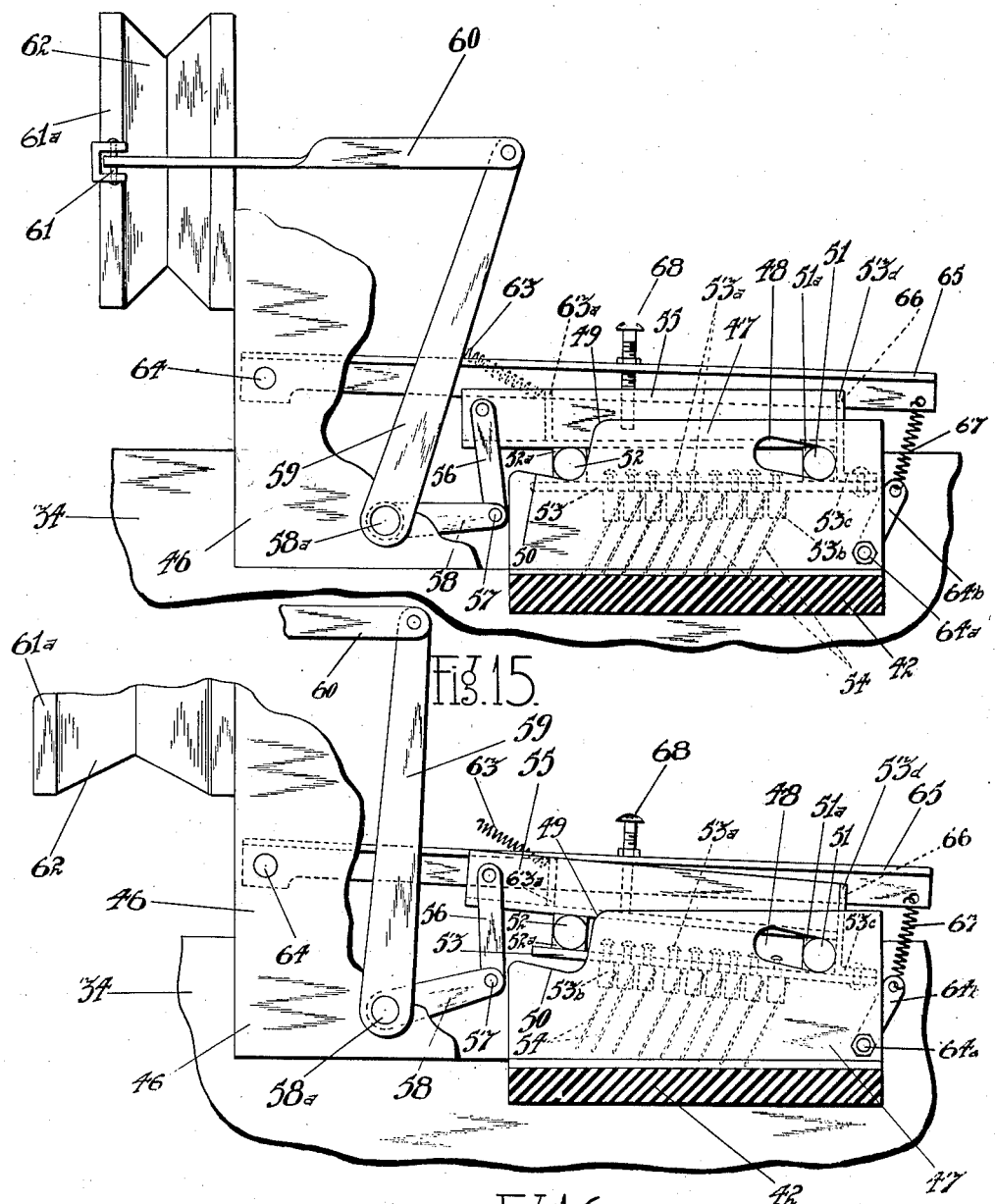
INVENTOR.
EDWIN A. LINK, JR.
BY
ATTORNEY.

Dec. 4, 1934.    E. A. LINK, JR    1,982,960
ILLUMINATED AERIAL DISPLAY
Filed April 27, 1934    12 Sheets-Sheet 7

INVENTOR.
EDWIN A. LINK, JR.
BY
ATTORNEY.

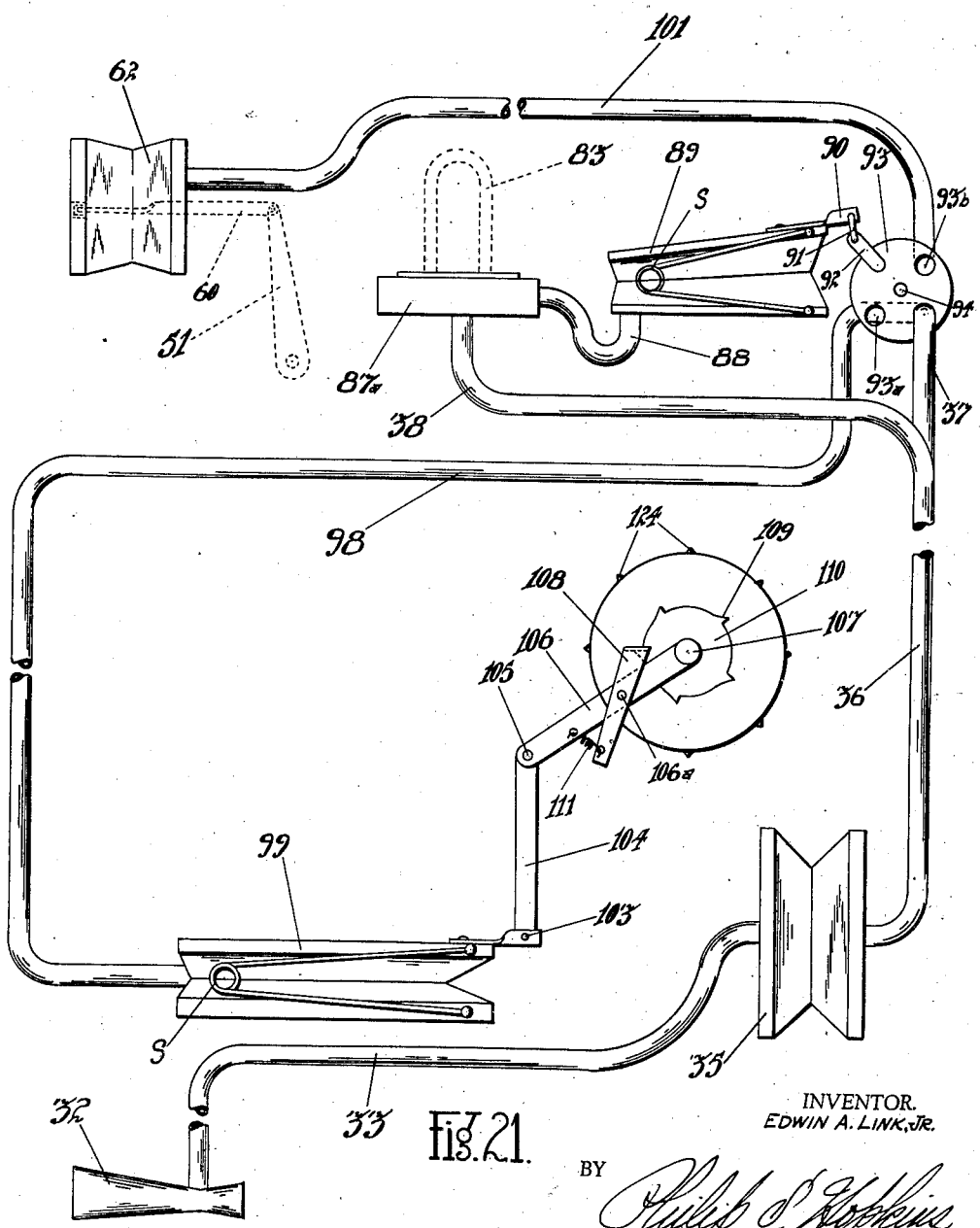

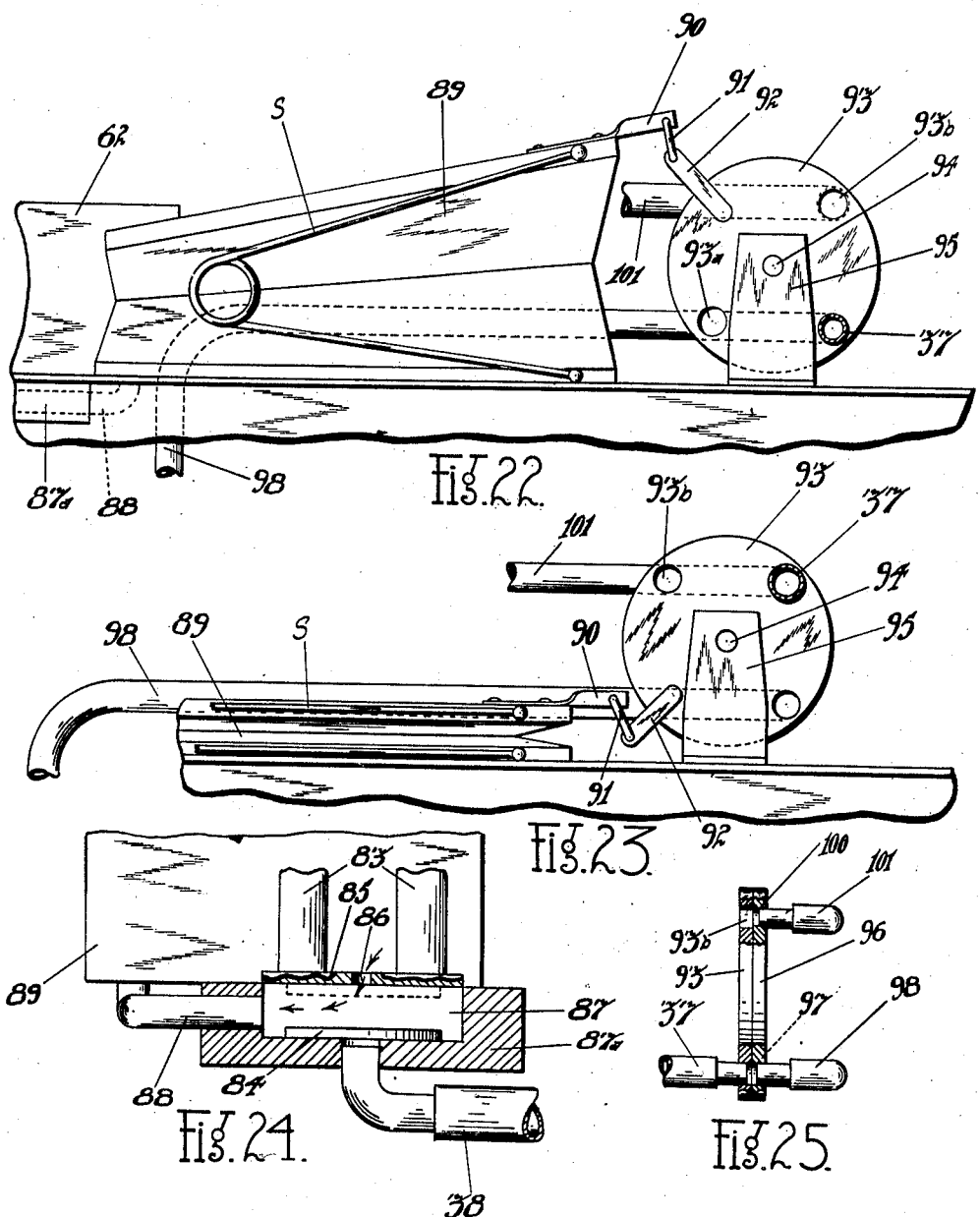

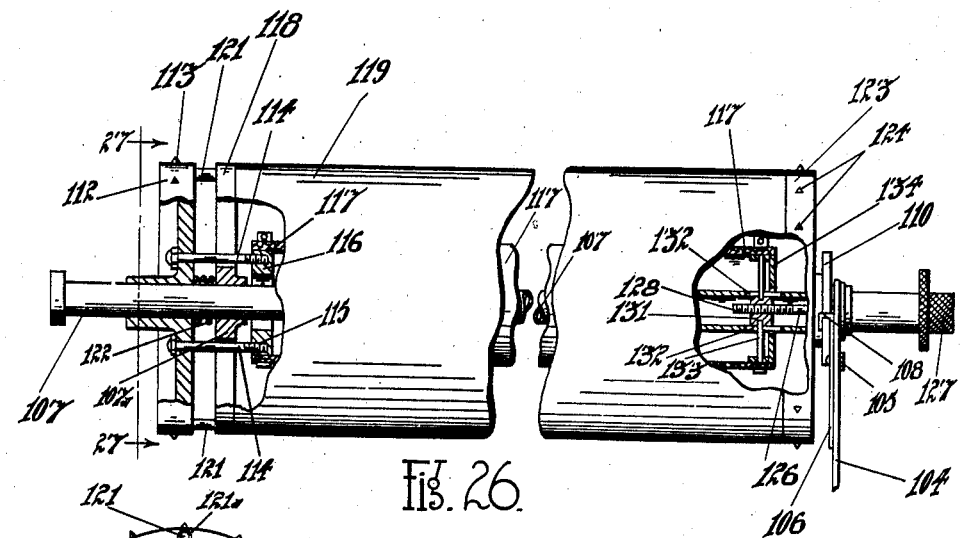

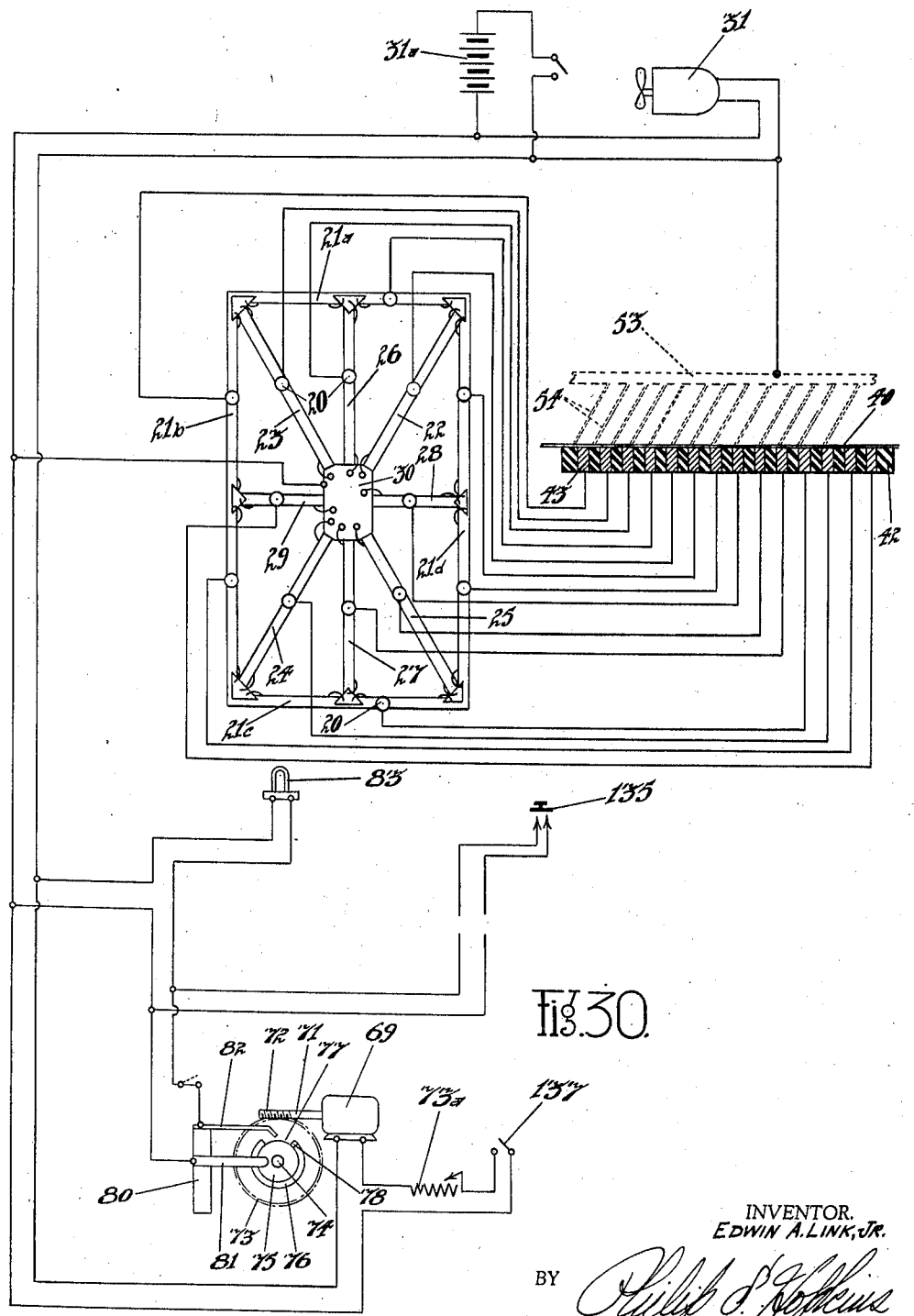

Dec. 4, 1934.    E. A. LINK, JR    1,982,960
ILLUMINATED AERIAL DISPLAY
Filed April 27, 1934    12 Sheets-Sheet 12

INVENTOR.
EDWIN A. LINK, JR.
BY
ATTORNEY.

Patented Dec. 4, 1934

1,982,960

UNITED STATES PATENT OFFICE 1,982,960

ILLUMINATED AERIAL DISPLAY

Edwin A. Link, Jr., Cortland, N. Y.

Application April 27, 1934, Serial No. 722,709

31 Claims. (Cl. 40—130)

My invention relates to illuminated aerial displays and is directed primarily to a changeable flashing electric sign upon an aeroplane or other aerial vehicle for night display or advertising purposes.

Many problems are presented in the provision of a practical aeroplane sign of the illuminated type and particularly if a change of message or display is desired. One of the factors involved is that of the weight of the sign and operating equipment. Another factor is the certainty of operation of the sign changing mechanism and a third, is the matter of breakage of the sign elements particularly if electric lamp bulbs are used. Likewise the adaptability of the device to permit changing the message or display while in flight and in a short time is a determining factor of economic practicability and usefulness.

I have provided a sign and an operating mechanism therefor, which fully meets these conditions and provides a very practical advertising or display device.

I have provided a simple, lightweight operating mechanism for the sign, by means of which any number of different messages or displays may be periodically and automatically provided on the sign while the aeroplane is in flight, and which can be changed readily by the operator from one set of displays to another, while in flight.

One of the important objects of my invention lies in the provision of a sign utilizing a plurality of letter frames, each of which is provided with lamp bulbs of the ordinary type, together with a mechanism for automatically and periodically flashing selected portions of the letter frames to provide a complete illuminated message or display, and which changes automatically at each flashing.

Another object is to provide a manual control for the electric circuits which is supplementary to the automatic control and by which the operator has simultaneous manual and selective control of the illumination of the sign.

Another object lies in the provision of an air driven means for supplying the source of current for the lamp bulbs of the sign.

Another object is to provide an actuating means for the sign changing device which is operated by an energy produced by the flight of the aeroplane.

A further object lies in the ready adaptability of the invention to various types and designs of aeroplanes, including monoplanes, biplanes, and autogiros.

Still another object lies in mounting the sign on an aeroplane in an angular position with respect to the horizontal plane of the aeroplane, whereby to reduce the lamp bulb breakage.

Another object lies in the provision of a novel form of contact maker and breaker for the flashing of the lamps of the sign, and the automatic and manual actuating means therefor.

It will be understood that while my invention is particularly adapted for aeroplanes and has been illustrated and will be described in connection therewith, it is equally adaptable and usable with other forms of aircraft, such as balloons, dirigibles, etc., and although for convenience in the specification and claims to follow, I will use the word "aeroplane", it may be taken to include any such other aerial vehicles.

Other objects and advantages will be apparent as the description proceeds, reference now being had to the figures of the accompanying drawings forming a part of this application and wherein like reference numerals indicate like parts.

In the drawings:

Figure 1 is a front view of one type of aeroplane, a monoplane, with the sign assembled thereon and illustrating the angular relation between the sign, the plane and the ground.

Figure 2 is a broken, partial view taken of the underside of the aeroplane and showing the general position of the sign with respect thereto.

Figure 3 is a detail cross sectional view taken on the line 3—3 of Figure 2 and illustrating the stream-lined conductor bar or cable through which the wires from the source of electricity to the lamp bulbs pass.

Figure 4 is a partial front edge view of the sign and frame, showing the supporting means therefor.

Figure 5 is a plan view of one sign letter frame such as may be used with my invention.

Figure 6 is a cross sectional view taken on the line 6—6 of Figure 4.

Figure 7 is a detail sectional view taken on the line 7—7 of Figure 5.

Figure 8 is a detail view of the center of one of the letter frames showing the arrangement of the letter bars.

Figure 9 is a sectional side view of the control apparatus for the periodic and automatic flashing of the lamps of the sign, certain parts being omitted and others broken away for clearness of illustration.

Figure 10 is a top plan view of the same apparatus.

Figure 15 is a detail view of one side of the assembled actuating mechanism for the contact maker and breaker, in one position.

Figure 16 is a similar detail view showing this mechanism in another position.

Figure 21 is a diagrammatic illustration showing the relation between the various bellows and the parts actuated thereby.

Figure 22 is a side view illustrating one of the bellows and the valve means actuated thereby.

Figure 23 is a similar view of the same parts in another position of operation.

Figure 24 is a detail sectional view illustrating the operating means for one of the bellows.

Figure 25 is a detail edge view, partly in section, of the valve shown in Figures 22 and 23.

Figure 26 is a side view of the web moving roller, the same being partially broken away and partially in section for clearness.

Figure 27 is an end view of the roller taken on line 27—27 of Figure 26.

Figure 28 is a detail view of a part of the roller mechanism.

Figure 29 is a detail view of the adjusting means for the compensating mechanism of the roller.

Figure 30 is a diagrammatic illustration of the electrical circuits involved in the invention.

Figure 11:
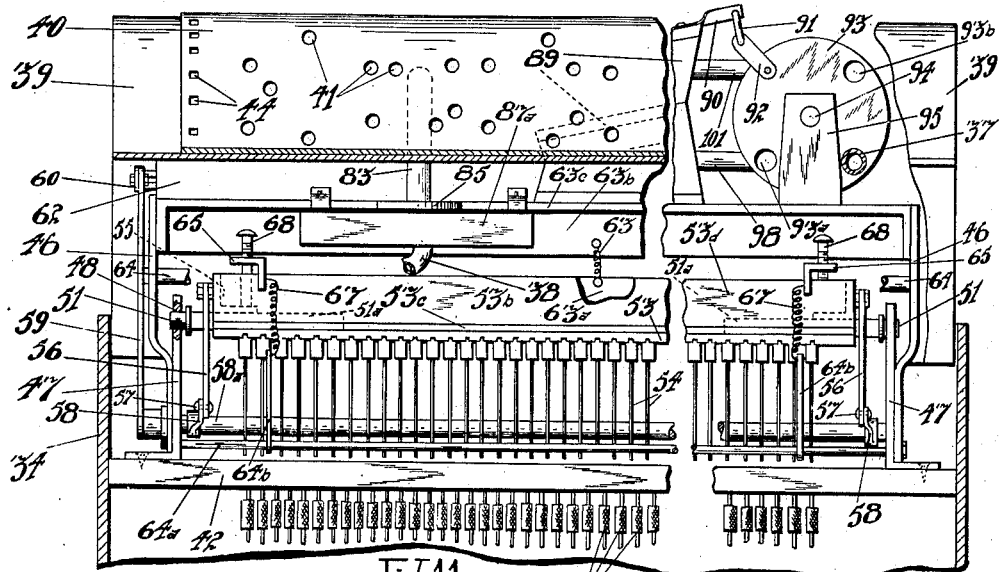
Figure 11 is a sectional view taken on the line 11—11 of Figure 9.
Figures 12, 13:
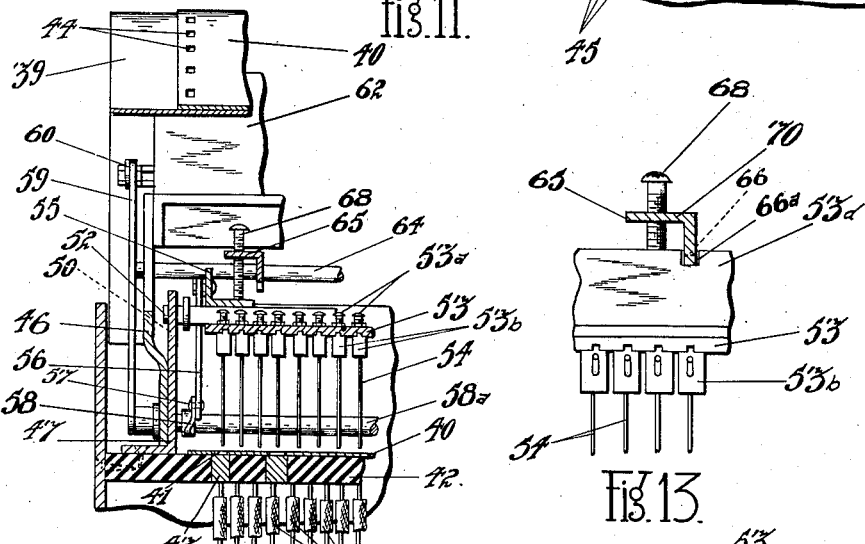
Figure 12 is a similar sectional view of one end of the apparatus only, taken on the line 12—12 of Figure 9.
Figure 13 is a detail sectional view showing the locking means for the front end of the movable contact maker and breaker member.

The reference numeral 1 refers generally to an aeroplane which may be of any type or construction and the details of which form no part of this invention other than in combination with the elements as hereinafter described. Suffice it to say that the aeroplane is provided with one or more wings 2, a source of power driving the propeller 3 and suitable landing gear 4, which, of course, could be adapted for water as well as land, or both.

My invention contemplates the mounting of a sign frame generally indicated at 5 upon the areoplane, the particular form of mounting or fastening the same thereto depending upon the construction and type of aeroplane used. In the instance shown in Figure 1, the sign is supported by struts 6 extending downwardly from the under surface of the wing 2 and to the lower ends of which the sign frame is secured.

Reference should now be had to Figures 4 and 6, which show the detailed fastening means for the sign. In Figure 6, two of the wing spars 7 are shown, and securely clamped to the upper and lower sides of each, by means of the bolts 8, are the plates 9 and 10. These plates are preferably channel plates, used in preference to flat plates to take advantage of the increased strength and resistance to bending.

Securely bolted to one of the vertical flanges of each of the lower plates 10, as at 11, is the upper end of a strut 6. Each of the struts 6 is a one piece, stream-lined tube, the upper end of which is split as at 11a to embrace each side of one of the vertical flanges of the plate 10, thus providing a secure fastening means for the same.

The lower end of each strut 6 is, as shown in Figures 4 and 6, also split and securely fastened as at 12 to an ear 13 which is welded or otherwise secured to a band 13a suitably secured to the stream-lined tube 14 which comprises one of the side bars of the sign supporting frame. In Figure 2 it is clear that there are two of these supporting frame bar tubes 14 running the full length of the sign and to which the sign elements or letter frames are secured by means of suitable U-shaped clamps 15, (Figures 4 and 6), which pass around the bars 14 and through the adjacent letter frame bar. The tubes 14 enclose solid supporting bars 16, lending strength to the frame. The ends of the clamps 15 are provided with nuts 17 whereby the clamps may be drawn tight or may be loosened to permit adjustment of the letter frames longitudinally of the supporting bars 16. It will be noted particularly from Figure 2 that the sign frame is disposed slightly rearwardly with respect to the wing in order that the weight may be more properly distributed.

In addition to the two side bars 16 of the supporting frame there is a central bar tube 18 parallel with the others which runs the length of the sign frame, this bar also being stream-lined, as shown in Figure 3, and hollow to receive the electric wires 19 which carry the current to the lamps 20 on the letter frames. This central bar 18 may serve either as an additional support for the letter frames or may be simply fastened to and carried by such letter frames.

It will be understood, of course, that the size of the letter frames, which are indicated generally as 21, is determined largely by the size and power of the aeroplane upon which they are mounted, as is also the number of them.

With reference particularly to Figure 5, it will be observed that these letter frames comprise a plurality of bars 21a, 21b, 21c, and 21d, assembled in the form of a rectangle, although this is, of course, an arbitrary arrangement and may be varied.

Extending from the center of the letter frame to the corners thereof are the bars 22, 23, 24, and 25. Extending from the center to the end bars, and centrally thereof, are the bars 26 and 27. Also extending from the center to the side bars of the frame, and centrally thereof, are the bars 28 and 29. These bars are all provided with electric lamps 20 suitably spaced thereon and the wiring arrangement for such lamps will be hereafter described. A plate 30 is provided at the center of the frame as a fastening and supporting means for the ends of the bars meeting at the center, and which may be also used, if desired, as a distributing plate for the contacts for the various bar lights. It will be understood, that with this arrangement of bars with lamps on them, a universal letter frame is provided by means of which any letter of the alphabet may be formed by the illumination of the desired bars, in a manner to be described.

The position of the letter frames 21 on the supporting frame 5 is such that the lamps 20 are on the outside and therefore readily visible from the ground when the aeroplane is in flight. Sockets 20a are provided at spaced intervals along the letter frame bars to receive the lamps 20, and a common "ground" conductor 20b is provided in all the bars.

With particular reference again to Figure 1, it will be noted that the sign frame 5 and the letter frames carried thereby, are positioned at a dihedral angle with respect to the ground, that is, the ends of the frame 5 are considerably higher than the center thereof, thus bringing the letter frames 21 progressively higher from the ground as they project outwardly from the center of the aeroplane. This is for the purpose of reducing materially the amount of bulb breakage incident to taking off and landing. It is well known that at such times and when taxiing on the ground, stones or other objects are thrown up against the underside of the aeroplane and also occasionally the tilting of the aeroplane to one side or the other results in dragging the end of the sign frame upon the ground, all of which would naturally result in breakage of the lamp bulbs 20. This particular feature of the position of the sign on aeroplanes is important from a practical standpoint.

As before explained generally, the purpose of this invention is to provide for the formation of letters and words on the sign which will be periodically illuminated and which are changeable to provide a succession of words or messages or displays. For this reason each of the bars of the letter frames are wired electrically independent of the other bars. Referring to Figures 5 and 30, the top bar 21a is wired as a single bar. Likewise the bars 21c, 22, 23, 24, 25, 26, 27, 28 and 29 are independently wired. The bars 21b and 21d are divided in half centrally and each half is wired independently of the other half. As before stated, the wires for the lamps on these letter frames are all carried through the central hollow tube 18 to the device which selectively illuminates the desired bars of the letter frames.

For a source of electric current by which the lamps may be illuminated, either or both of two means may be provided. A wind driven generator 31 (Figures 1 and 30) may be mounted upon any suitable part of the aeroplane and the current generated thereby utilized as the current for the lamps. Storage batteries 31a (Figure 30) may be provided in the aeroplane as the source of electric current. As a matter of fact, it has been found to be practical to use both of these sources of electric energy in combination to provide the necessary electric current. It is also obvious that if desired, a motor driven generator receiving its power from the motor of the aeroplane may be utilized for this purpose.

In order that the electric current may be selectively distributed to the desired bars of letter frames, I have provided in the aeroplane a controlling mechanism by means of which the selected letters may be periodically illuminated automatically and with successive changes of whatever number desired. This controlling and actuating mechanism will now be described.

In order that the mechanism for operating the sign may be as light in weight as possible, thereby adapting it particularly for aeroplane use, I have employed air or reduced air, as the primary controlling medium.

In Figure 1, there is shown at 32 a Venturi tube suitably mounted upon the aeroplane and a pipe line 33 extending from the Venturi tube to the operating mechanism within the aeroplane. This tube and pipe line provide, all the time the aeroplane is in flight, a considerable source of power in the form of suction which I utilize in actuating many of the parts of the changing apparatus. And while I have shown and will describe the use of suction as the primary actuating medium, it will be clear that with but a few changes in construction of parts, air pressure could be substituted for suction.

Referring now to Figure 9, it will be observed that there is provided a casing 34 which is preferably made of light weight material such as aluminum and in which the changing mechanism is mounted. Within this casing there is suitably mounted a relatively large bellows 35 which acts as a vacuum equalizer and with which the pipe line 33 is directly connected.

Also connected with this bellows 35 is a pipe line 36 which is provided adjacent its upper end with two branch lines 37 and 38 for a purpose to be described.

Figure 17:
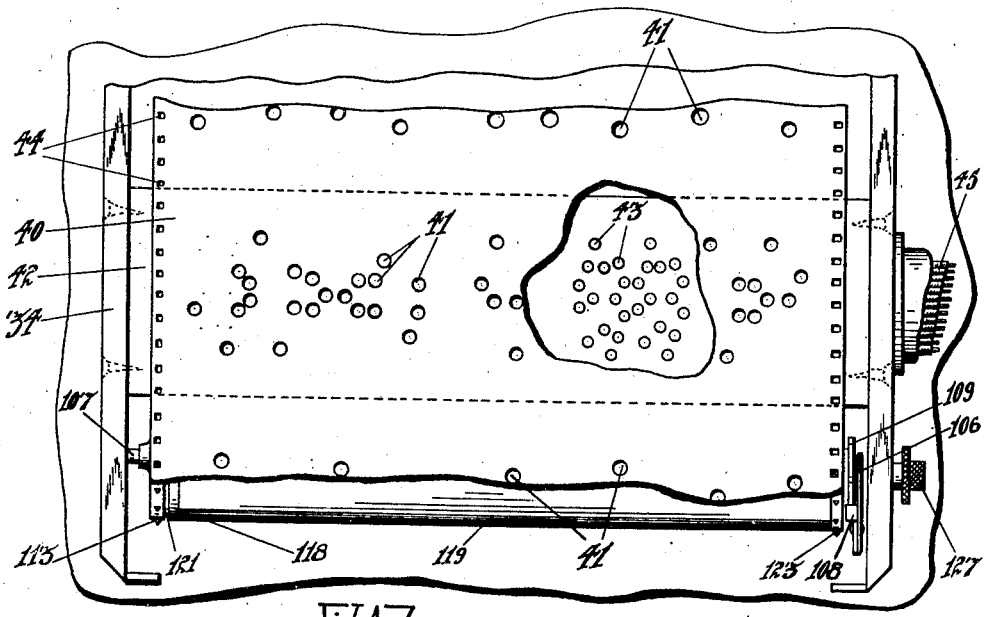
Figure 17 is a detail top plan view illustrating the cooperation between the web and the fixed contact plate and partly broken away to show the arrangement of the fixed contacts.
Figure 20:
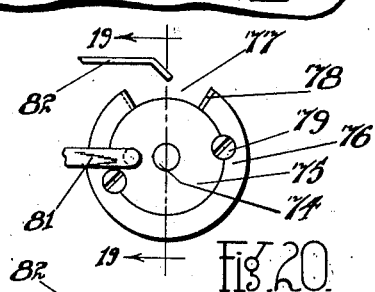
Figure 20 is a detail face view of the circuit closer shown in Figure 18, with the adjustable contact member in a different position, to illustrate the variability of the automatic flashing means.
Figure 19:
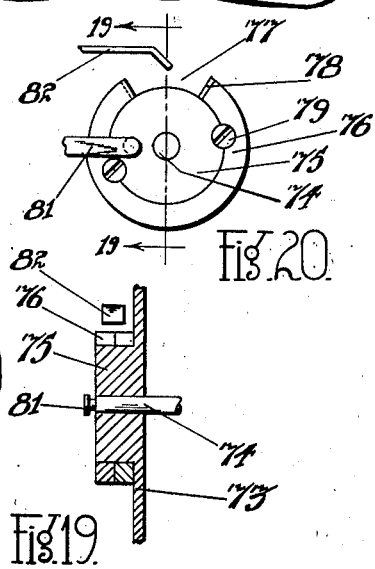
Figure 19 is a sectional view taken on the line 19—19 of Figure 20.
Figure 18:
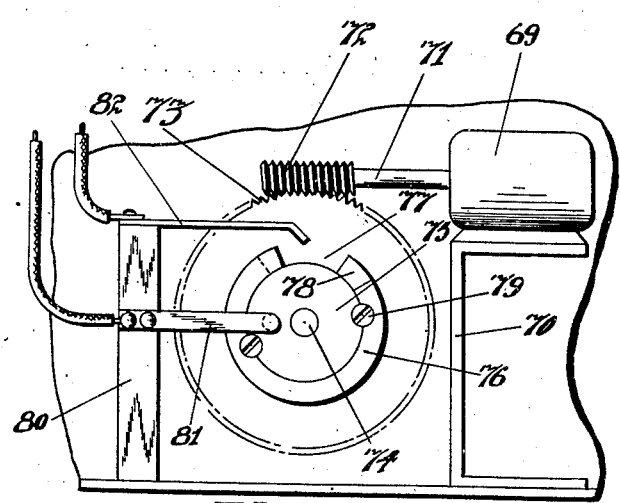
Figure 18 is a detail side view of the motor driven circuit closer for the automatic operation of the sign flashing mechanism.

Also suitably mounted within the casing is a smooth surfaced guide plate 39 over which is trained and adapted to be drawn an endless web 40. This endless web comprises the controlling element of the changing apparatus and is prepared for use by perforating it as at 41 (see Figure 17). The perforations are so placed that when the web is moved in a manner hereinafter described over a fixed contact platen 42 (see Figure 9), such perforations will register with fixed contacts 43 on the platen and by means of which selected circuits to the sign frame bars may be closed. The edges of the web 40 are provided with sprocket perforations 44 by means of which the web is moved step by step in a manner to be described.

The contact platen 42 is a fixed plate of insulating material provided with a plurality of conductor contact members insulated from each other, one of said contact members being provided for each of the independently wired bars or bar sections of the letter frames constituting the entire sign. Consequently the closing of a circuit through any one of the contacts on the platen 42 results in illuminating the lamps mounted upon that particular bar or bar section controlled by that contact. It will thus be obvious that the web 40 may be perforated across its width in a manner to illuminate any desired letter frame bars or sections desired whereby any selected word or display can be illuminated on the sign. It will be clear from Figure 9 that each of the contact members 43 has connected thereto, wires 45 which are suitably drawn together in a bunch or group and run from the casing 34 into the conduit bar 18 from which the wires extend to their appropriate letter bars or sections.

Suitably mounted in the casing 34 upon the fixed platen 42 are fixed supporting brackets 47, disposed adjacent the sides of the casing (Figure 11). Suitably secured to the brackets 47 are the upstanding plates 46. The brackets 47 are each provided adjacent one end with an inclined slot 48 (see Figures 9, 15 and 16), and on the opposite end with a cutaway portion 49, the bottom of which is inclined at the same angle as the slot 48. Riding in the slots 48 and on the inclined surfaces 50 of the cutaway portion 49, are the smooth cylindrical ends 51 and 52 respectively of supporting bars 51a and 52a respectively. Securely fastened to the underside of the bars 51a and 52a and extending between the same in overlying relation to the platen 42 is the movable contact plate 53. Secured to the underside of the plate 53, as by screws 53a, are slotted blocks 53b holding downwardly extending contact brushes 54 which are flexible in nature and adapted when lowered to engage with the web 40 at the point at which it passes over and in engagement with the fixed contact plate 42. Obviously any perforations in the web which are in alignment with the contacts 43 in the fixed plate will allow the brushes 54 when lowered to engage such contacts, to establish the circuit to the appropriate sign bar sections, there being provided a brush 54 for each fixed contact 43 in the platen 42. It goes without saying that the brush contacts 54 are provided with suitable wiring connections with the source of current.

Figure 14:
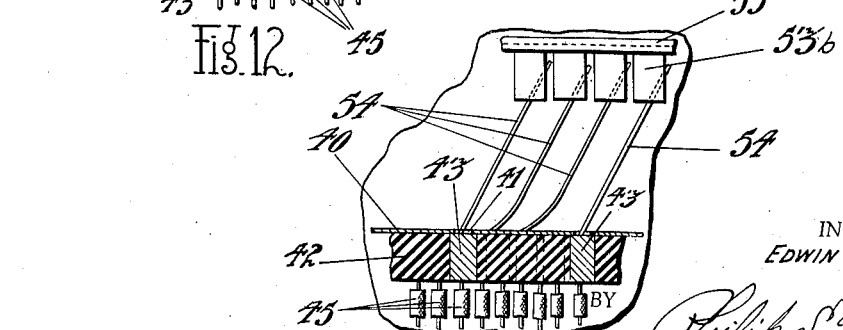
Figure 14 is a detail sectional view illustrating the operation of the brushes of the contact maker and breaker.

Secured to the upper sides of the bars 51a and 52a and in line with the opposite side edges of contact plate 53, are angle members 55 pivoted to the rear ends of which are links 56 pivoted at their opposite ends as at 57 to links 58 secured in turn at their opposite ends to a shaft bar 58a extending across the casing and journaled at its opposite ends in the brackets 47 and plates 46. Secured to one projecting end of the shaft bar 58a (Figures 11, 12, 15 and 16) is the lower end of an arm 59 extending upwardly beyond the bracket 46 and having pivoted to its upper end the link 60, the opposite end of which is pivotally connected, as at 61, to the movable side 61a of a bellows 62. It will be apparent that if the bellows 62 is collapsed, through the action of the link 60, the arm 59 will, be rocked to the right as in Figure 15, resulting in moving the movable plate 53 to the right and downwardly in Figure 9, the downward movement being caused by the ends 51 and 52 of bars 51a and 52a riding in the slots 49 and on the inclined surfaces 50 respectively, thus causing the plate 53 to be lowered, bringing the flexible contacts 54 into engagement with the web 40 with a wiping motion (Figure 14) whereby certain of such contacts will move into engagement through the perforations which happen to be overlying the fixed contact plate at the time, and thus establishing contact as before described.

This downward movement of the contact plate 53 is against the tension of the coil spring 63 (Figure 11) secured at its lower end to the vertical plate 63a secured to the rear bars 52a and extending between them, and at its upper end to the rear vertical depending flange 63b of a supporting plate 63c fixed to and extending between the brackets 46. It will be clear, therefore, that when the bellows 62 is permitted to resume its open position as hereinafter explained, the influence of the spring 63 will be to return the contact plate 53 upwardly to its normal out of contact position, said spring exerting its force directly upon the rear edge of plate 53.

It will be noted with reference to Figures 15 and 16, that the front or forward edge of the contact plate 53 projects beyond the front ends of the angle members 55. Secured to this projecting portion is an angle plate 53c, the vertical flange 53d of which extends upwardly adjacent the front ends of the members 55 and to substantially the same height as such members.

There is thus formed a box-like frame structure with the upper surface of plate 53 comprising the bottom, the angle members 55 comprising the sides, though it will be noted that such angle members are spaced somewhat above the bottom plate 53, the plate 63a comprising the back side, and the vertical flange 53d of angle plate 53c constituting the front side. This entire structure is, of course, movable with the bars 51a and 52a to which it is secured.

Mounted adjacent the rear edges of the supporting plates 46 and the brackets 47 and supported thereby is a shaft 64 extending across between such plates. Pivoted to said shaft adjacent each end thereof are the lock bars 65 extending forwardly over the box-like frame above described and having their free forward ends projecting beyond the flange 53d. (See Figures 10, 11, 15 and 16.) The vertical flanges 65a of these lock bars are provided adjacent their front ends with notches 66 (Figure 9). The flange 53d is provided with notches 66a within which the lock bars engage and are guided. The rear plate 63a is also provided with suitable notches (not shown) in which said lock bars are guided.

Also mounted in the supporting plates 46 and brackets 47, adjacent the front lower ends thereof and extending therebetween, is a shaft 64a to which are secured upstanding arms 64b. These arms comprise anchorages for coil springs 67 connected at their opposite ends to the free forward ends of the lock bars 65. Thus such lock bars are normally urged downwardly in contact with the plates 53d and 63a, in the notches therein. It may be stated here also that in the normal position of the parts, with the contact plate 53 up and out of contacting relation with the web 40, the notches 66 in the lock bars are out of registry with the notches 66a in the plate 53d. When the contact plate is lowered, however, and during its lowering and forward movement (in the slots 48 and notches 49) the notches 66 engage the plate 53d within the notches 66a and thus lock the bars and such plate together. This is for a purpose to be described.

The horizontal flanges of the lock bars 65 are each provided with a set screw 68, the lower end of which projects downwardly to a point overlying the horizontal flanges of the supporting plates 55. The screws may be adjusted to the desired position relative to such plates.

With reference now to Figures 9, 15 and 16, the operation of the parts just described will be explained.

Figure 9 shows the parts in normal position with the contact plate 53 in the uppermost position. When the bellows 62 is collapsed, in a manner to be explained, the arm 59, through links 60, 58 and 56 causes the downward and forward movement of the plate 53 and all parts movable therewith. This downward contact making position is shown in Figure 15. In this position the lock bars 65 rock downwardly on their pivots under the influence of springs 67 and the notches 66 in the bars register with the notches 66a in the plate 53d, thus locking the front end of the contact plate 53 in its downward position. Now when the bellows 62 is again expanded, the arm 59 through the same link connections lifts, with the help of the spring 63, the rear end of the plate 53 upwardly as shown in Figure 16. This lifting of the rear end of the contact plate and frame is permitted by the open notches 49 in the supporting plates 47 and the lift is high enough to disengage all the contact brushes from the web 40. When the upward movement of the plate 53 reaches the point where the horizontal flanges of the angle members 55 engage the screws 68 in the lock bars, such bars are lifted and the notches 66 disengaged from notches 66a, thereby permitting the front end of plate 53 to raise also to normal position by the spring 63.

This motion of the movable contact member away from the fixed contact member is important as it provides for the instantaneous disengagement of all contact members and then restores the parts to normal position from which the contacts can again be "wiped" into engagement upon the next operation.

The mechanism for periodically and automatically moving the contact plate 53 downwardly into contact engagement will now be described. (See Figures 9, and 18 to 20.)

Within the casing 34 is provided a small electric motor 69, mounted upon a suitable supporting bracket 70, the shaft 71 of which motor may be provided with a worm driving gear 72 meshing with the worm teeth of a gear 73 upon a shaft 74. The motor 69 is a variable speed motor provided with the usual speed change rheostat 73a (Figure 30) by means of which the speed of the motor can be regulated at will. The gear 73 is provided upon one side with a cylindrical hub portion 75. Mounted upon this hub portion is a split contact ring 76, the ends of which are spaced apart as at 77 to provide a break in the contact. A second split contact ring 78 is also provided on the hub 75 contiguous to the ring 76. Screws 79 serve to hold said rings in position and to permit their relative adjustment whereby the gap or break 77 may be adjusted as to width.

A fixed post 80 provides a supporting means for a spring contact member 81 engaging against the flat face of the hub 75 to provide continuous unbroken connection for one side of the circuit. A second contact member 82 is mounted upon the post 80, and the end of which is in position to engage the peripheries of both of the contact rings 76 and 78 and ride thereon during the rotation of the gear 73, until it reaches the break 77 whereupon the circuit is broken. A very slight current is required for this circuit, as will be hereafter pointed out and more fully described in connection with the entire electric system shown in Figure 30.

The circuit which includes contacts 81 and 82 leads to an electromagnet 83 (see Figures 9, and 24) the armature 84 of which comprises a disk adapted to serve as a valve operating toward and away from a disk 85 fixed to the lower ends of the posts of the magnet 83 and having an opening 86 therethrough to the atmosphere. The armature disk 84 is positioned within a chamber 87 provided in a block 87a suitably mounted upon the underside of the fixed cover plate 63c (Figure 11). Normally, and when the magnet 85 is not energized, the disk 84 lies in the bottom of the chamber 87 in which position it covers the open end of the pipe 38, the suction force in such pipe holding said disk in engagement therewith. Obviously therefore, there is no suction force in the chamber 87 nor through the pipe 88 communicating therewith and extending to a bellows 89, such bellows being therefore normally in open position as shown in Figure 22. When the magnet 83 is energized, however, by the closing of the circuit by the contact member 82 engaging the contact rings 76 and 78, during the rotation of the gear 73, the armature disk 84 is drawn upwardly in Figure 24 to close the opening 86 and to establish communication between the suction pipe 38 and the suction pipe 88 and the bellows 89, whereupon such bellows will collapse to the position shown in Figure 23.

The upper or movable side of the bellows 89 is provided with an arm 90 connected to which is a link 91 secured to an arm 92 fastened at its opposite end to the disk 93 rotatably mounted upon a center pintle 94 supported by a bracket 95. Connected with the disk 93 is one end of the pipe 37 from the suction line and the disk 93 is provided with an opening therethrough in registry with the end of the pipe 37, the latter being flexible to permit rotation of the disk 93 to which it is attached. Also mounted upon the pintle 94 and in contiguous relation with the disk 93 is a second disk 96 which is stationary. This disk 96 is also provided with an opening 97 normally in registry with the opening in the disk 93. Communicating with this opening is one end of a pipe 98 which leads to a bellows 99. The disk 96 is also provided at another point spaced from the opening 97 with another opening 100 with which communicates one end of a pipe 101 which leads to the bellows 62.

In Figure 21 the relation and operation of the various bellows and their cooperating mechanical and electrical elements has been diagrammatically illustrated. This figure shows the Venturi tube 32 which, when the aeroplane is in flight, provides the suction comprising the actuating energy for the sign changing mechanism. This suction energy communicates through tube 33 with the equalizer bellows 35. From this bellows the tube 36 furnishes a supply of this energy to the two branch lines or tubes 37 and 38.

The tube 37, normally in registry and communication with the tube 98 through the opening 97 in the disk 96, normally keeps the bellows 99 in collapsed position. This bellows 99, as will be pointed out in detail hereafter, is the actuating device for the web moving mechanism.

The tube 38 provides a constant suction force for the armature valve disk 84, thus cutting off the suction through the tube 88 to the bellows 89. Such bellows is, therefore, normally extended to open position, in which position the suction from tube 37 is communicated through the disks 93 and 96 to the bellows 99 as above described, and also in which position the tube 101 is out of registry with any suction line and therefore, the bellows 62 is in its normally extended or open position.

Now when the magnet 83 is energized by the closing of its circuit through contacts 82—76—78, as before described, or by actuation of a manual control contact maker and breaker hereinafter described, the disk valve 84 is lifted and the suction energy through tube 38 is applied through chamber 87 and tube 88 to the bellows 89, collapsing the same. The closing of bellows 89 results in rotating the disk 93 and this serves a double function. First, it breaks the suction energy in tube 98 which causes the bellows 99 to open or expand. This places the web moving mechanism in position for operation when the bellows is again collapsed to its normal position, as will be presently described in detail. Secondly, it establishes communication between the suction energy in tube 37 and the tube 101, through the opening 100 in disk 96, thus collapsing the bellows 62, whereby the movable contact plate 53 is moved to contact closing position with certain contacts on the fixed platen 42, as determined by the perforations in the web 40 overlying such platen, and thus illuminating the selected sign letters or display. This condition remains until the contact 82 reaches the break 77 in the magnet circuit or until the manual circuit control, hereinafter described, is released, whereupon the magnet 83 is deenergized. Then the disk 84 returns to its normal position of Figure 24 and the suction to bellows 89 is broken and such bellows immediately opens or expands to its normal position. Upon such opening of the bellows 89, the disk 93 is returned to its normal position and in doing so it first breaks the suction to the bellows 62 which then opens to normal position, resulting in raising the contact plate 53 out of contact making position and thus extinguishing the sign lamps, and secondly, suction is reestablished through tube 98 to bellows 99, collapsing the same to normal position and in doing so moving the web 40 to bring the next set of perforations over the contact platen 42 in readiness for the next flashing operation which occurs when the magnet circuit is again energized.

It will be noted that the disk 93 is provided with an opening 93a to the atmosphere which, when the disk is rotated by collapsing the bellows 89, moves into registry with tube 98 and opening 97 thus making possible the immediate opening of bellows 99. The disk 93 is also provided with a second opening 93b to the atmosphere which is normally in registry with the tube 101 through opening 100. This insures the normal open or expanded position of bellows 62.

It will also be noted that each of the bellows is provided with a spring S which normally urges the bellows to open or expanded position. The collapsing of each bellows is thus done against the tension of its spring and when the suction to the bellows is broken, the spring S immediately returns the bellows to open position, aided by communication between each bellows and the atmosphere through openings 93a, 93b and 86 (with respect to bellows 89) as previously described.

This use of air, or reduced air, and the bellows as described, is very important from the practical standpoint as it makes possible an apparatus which is light in weight for the aeroplane to carry and is a very economical source of energy for the operating parts of the sign changing mechanism, as the activating force or energy is provided merely by the movement of the plane through the air.

As previously stated, the bellows 99 is the primary actuating device for moving the web 40 step by step over and in engagement with the fixed contact platen 42, in order to periodically bring a new set of perforations over such contact plate for the establishment of the electric contact to the lamps of the sign frame and thus change the sign or display.

Pivotally secured as at 103 (Figure 21) to the upper or movable side of the bellows 99 is the lower end of a link 104, the upper end of which has pivotal connection at 105 with an arm 106 pivoted at its opposite end on a shaft 107. Pivoted upon the arm 106, at 106a, is a pawl 108, one end of which is in the form of a hook, as shown in Figure 26, and which is adapted to engage with the teeth 109 on the periphery of a ratchet disk 110 secured on the shaft 107. A light coil spring 111 connects the opposite end of pawl 108 and the arm 106 whereby the pawl is normally maintained in tooth engaging position. Obviously upon the downward movement of the bellows 99, the disk 110 and the shaft 107 will be rotated by the action of the pawl engaging the teeth of the ratchet disk, the extent of the movement being determined by the collapse of the bellows 99. When the bellows are released and returned to open position in the manner heretofore described, the arm 106 and the pawl 108 will again move upwardly, ready for the next down movement and rotation of the shaft.

Loosely mounted upon the shaft 107, which shaft is preferably in the form of a hollow tube, is a toothed sprocket disk 112 (Figure 26) provided with sprocket teeth 113 which are adapted to engage the sprocket perforations 44 along one edge of the web 40. Projecting inwardly from the sprocket disk 112 are the spaced pins 114, said pins extending into openings 115 in a ring 116 surrounding the shaft 107 and having attached thereto one end of a cylinder 117 of the same material as the web 40, usually paper. The pins 114 are secured within the openings 115 of the ring 116 in any suitable manner whereby such ring 116 and the sprocket 112 are rigid with respect to each other.

Suitably keyed upon the shaft 107 is the hub 107a of a disk 118 forming one end of a cylinder 119 preferably of metal or the like, and of the same diameter as the sprocket disk 112, such cylinder supporting the web 40 while the same is in contact therewith.

A spring pressed tension shoe 120 (see Figure 9) is suitably supported upon the casing 34 and provided for normally maintaining the web in contact with a portion of the periphery of the cylinder 119 and the sprocket teeth thereof.

Secured to the disk 118 and extending outwardly therefrom are the spaced pins 121 which freely engage in and pass through suitable openings 121a in the sprocket disk 112 whereby the cylinder 119 is rotatably connected with such sprocket disk but permitting longitudinal adjustment of the disk with respect thereto. A light coil spring 122 encircles the shaft 107 between the sprocket disk 112 and the hub 107a of the cylinder end 118 whereby a normal tension is applied toward the separation of these two disks, that is, normally tending to urge the disk 112 to the left in Figure 26.

The opposite end of the cylinder 119 is provided with a sprocket disk 123 having sprocket teeth 124, the distance between the sprocket disks 112 and 123 corresponding to the normal width of the web 40, and the sprocket teeth 124 serving to engage the sprocket perforations 44 on the opposite edge of the web from the disk 112.

The disk 123 is suitably keyed upon the shaft 107 for rotation therewith.

A plug 125 (Figures 26 and 29) is fixed in one end of the shaft 107 and mounted for rotation in this plug is an adjusting screw 126 provided at its outer end with a knurled finger piece 127 and extending inwardly through the hollow shaft 107 for a substantial distance and with its inner end threaded as at 128. This adjusting screw is held against longitudinal adjustment through the plug 125 by means of the collar 129 provided on the screw shaft at the point where it extends through the plug 125, into the shaft 107. The plug is suitably rigidly secured in the hollow shaft as by the pin and slot connection 129a.

Slidably mounted within the shaft 107 at a point spaced inwardly from the disk 123, and within the confines of the outer cylinder 119, is a plug 131 provided centrally with a threaded opening to receive the threaded end 128 of the adjusting screw 126. Extending outwardly in opposite directions from the plug 131, and passing through elongated slots 132 in the shaft 107, are the pins 133. These pins extend to and support a ring disk 134 surrounding the shaft 107 and constituting the opposite end support for the inner paper cylinder 117, to which it is secured. It will be clear, therefore, that upon rotation of the adjusting screw 126, in either direction, the plug 131 will be adjusted longitudinally of the shaft 107, moving with it the disk 134 and the cylinder 117, and through such cylinder the sprocket disk 112, the latter being slidably mounted upon the shaft 107 as before described. This permits a certain amount of adjustment of the distance between the sprocket disks 112 and 123 to accommodate the particular width of the web 40 which is to be driven thereby. Inasmuch as the web 40 is usually of paper or like material, changing atmospheric conditions may cause such web to contract or expand with variations in the dampness or the dryness of the atmosphere. It has been found by experience, as a matter of fact, that with the apparatus stored for instance in the daytime in a dry, heated hangar, and then taken out and flown in damp atmosphere, the web will take up moisture and expand materially. The apparatus just described is designed to automatically compensate for any such variation in the width of the web 40 due to this shrinkage, or expansion, for it will be clear that if this change in width occurs during the use of the apparatus, the cylinder 117 being of the same material as the web 40, will also shrink or expand to the same extent. Shrinkage or expansion of the cylinder 117 will, of course, result in moving the end disk 116 thereof and consequently the sprocket disk 112 to which it is attached by the pins 114, longitudinally of the shaft in relation to the metal cylinder 119 over which the web 40 passes. This longitudinal movement of the disk 112 is made possible by the pins 121 passing freely through the openings 121a in such disk, such pins also preventing relative rotary movement on the part of the disk with respect to the cylinder 119.

From the foregoing description it will thus be clear that as the bellows 99 are collapsed in the manner heretofore explained, the shaft 107 and consequently the sprocket disks 112 and 123 and the metal roller 119, will be rotated one step, to bring the next set of perforations on the web 40 into proper position over the fixed contact plate 42, ready for the next operation of the contact maker and breaker.

From the mechanism so far described, it will be apparent that the flashing of the sign and the changing of the message or display flashed each step is provided for automatically so that it requires no attention or manual operation. It is often desirable, however, that the operator or pilot of the plane be able to vary the regular periodical flashing or changing of the message, such as for instance, keeping one certain message or display illuminated for a longer period of time than provided for in the automatic operation.

This has been provided for in the following manner. In the electrical diagram figure, Figure 30, it will be observed that included in the circuit of the magnet 83, and between such magnet and the contacts 82—76—78 of the periodic control, there is provided a manually operable contact maker and breaker 135 of any conventional design, and which may be located at any convenient point in the aeroplane for operation by the pilot at any time desired. In practice it has been found convenient to mount this contact maker and breaker 135 on the control stick of the aeroplane.

It is obvious that with this arrangement, whether the contact 82 is engaged with contacts 76—78, or is in the gap 77, (Figure 18), closing the circuit to the magnet 83 by contact maker and breaker 135 insures the energizing of the magnet and the continued energization thereof so long as the contact 135 is held to circuit closing position. By this means the pilot may keep the illumination of any particular word or display on for as long as is desired without regard to the automatic and periodic control, for as long as the magnet 83 is energized, the sign will remain illuminated in accordance with the perforations of the web which are over the fixed contact plate 42 and no change will take place.

Upon releasing the contact maker and breaker 135, the operation immediately reverts to the automatic control previously described.

A motor switch 137 is provided for the motor 69. It is believed that the diagram of Figure 30 is clear and requires no detailed explanation. Suffice it to say that each bar or bar section of each letter frame is separately connected by suitable wires to the plate 30 which provides a common connection with one side of the current supply circuit. Each of the lamps 20 has its connection with this common side of the circuit and also its connection direct with the particular contact 43 of the platen 42, the lamps of each bar or bar section being connected in parallel. Only one lamp 20 has been shown on each bar, representing the plurality of such lamps on each bar or bar section.

Figure 31:
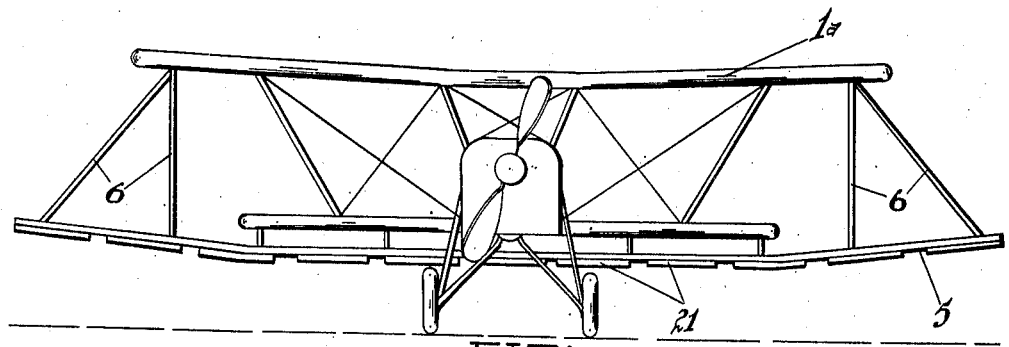
Figure 31 is an outline figure illustrating the adaptability of the sign for a biplane.

In Figure 31 I have illustrated the application of my sign invention to a biplane 1a. Except for the specific arrangement of the fastening and securing means for the sign frame to the aeroplane structure, the parts are identical with those previously described.

Figure 32:
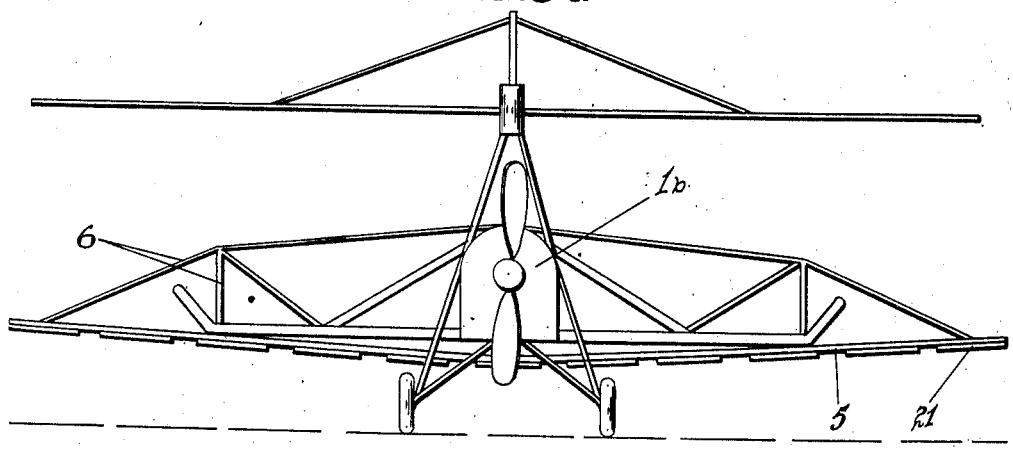
Figure 32 is an outline figure illustrating the adaptability of the sign for an autogiro.

In Figure 32 I have shown the application of the sign to an autogiro 1b. Here again, except for the specific arrangement of the fastening and securing means, the parts are the same as described.

The operation of the various elements constituting the embodiment of the invention has been described along with the detailed explanation thereof and no further description of the operation is deemed necessary.

From the foregoing it will be clear that I have provided a flashing changeable electric sign for aeroplanes, particularly adapted for aeroplane use by structure of light weight and by the use of an operating medium provided by the plane in flight. The legend determining member, the web, is easily prepared to provide any number of changes desired in a given message or display. Also the web may obviously be readily changed, while in flight, to change the message or display.

Of course, changes may be made in details of construction and operation and I do not limit myself to the form shown and described other than by the appended claims.

I claim:

1. In combination with an aeroplane, an illuminable, changeable sign carried thereby, means for changing said sign, and means including a contact maker and breaker actuated by the flight of the aeroplane for operating said changing means.

2. In combination with an aeroplane, an illuminable changeable sign carried thereby, means for changing and illuminating said sign, and means including a contact maker and breaker actuated by the flight of the aeroplane for operating said changing and illuminating means.

3. In combination with an aeroplane, an illuminable, changeable sign carried thereby, means including a contact maker and breaker for changing and illuminating said sign while in flight, and an air force provided by the flight of the aeroplane and having operative communication with said contact maker and breaker for actuating said changing and illuminating means.

4. In combination with an aeroplane, an illuminable, changeable sign carried thereby, means including a contact maker and breaker for changing and illuminating said sign while in flight, and suction means provided by the flight of the aeroplane and having operative communication with said contact maker and breaker for actuating said changing and illuminating means.

5. In combination with an aeroplane, an illuminable, changeable sign carried thereby, continuously operating mechanism for periodically changing and illuminating said sign while in flight, and independent, manually operable means operatively connected with said changing and illuminating mechanism for controlling the period of illumination of any selected sign message independently of changing and illuminating means.

6. In combination with an aeroplane, an illuminable, changeable sign carried thereby, means for periodically changing and illuminating said sign while in flight, independent, manually operable means for controllng said changing and illuminating means, and means actuated by the flight of the aeroplane for operating said periodic changing and illuminating means.

7. In combination with an aeroplane, an illuminable sign carried thereby comprising a frame provided with electric lamps, a source of electric current for said lamps provided by said aeroplane in flight, a second source of electric current for said lamps, means for selectively illuminating said lamps from either and from both said sources, and means cooperating with said sources for periodically illuminating said sign, said means including a contact maker and breaker in the circuits of said sources and said lamps and an air force provided by the flight of the aeroplane for actuating the same.

8. In combination with an aeroplane, an illuminable sign carried thereby comprising a frame provided with electric lamps, a source of electric current for said lamps provided by said aeroplane in flight, a second source of electric current for said lamps, means for selectively illuminating said lamps from either and from both said sources, means cooperating with said sources for periodically illuminating said sign, said means including a contact maker and breaker in the circuits of said sources and said lamps and an air force provided by the flight of the aeroplane, and independent, manually operable means operatively connected with said illuminating means for controlling the period of said illumination for any selected sign message.

9. In combination with an aeroplane, an illuminable sign carried thereby comprising a plurality of frames having individually illuminable sections whereby the illuminated display of said sign may be changed, electric lamps on said sections, a source of electric current for said lamps, continuously operating mechanism including a contact maker and breaker in the circuits of said lamps and said source for periodically illuminating certain of said sections in a predetermined order to provide a periodically changing illuminated sign, and independent, manually operable means for maintaining the continued illumination of any of said predetermined sections indefinitely.

10. In combination with an aeroplane, an illuminable sign carried thereby comprising a plurality of frames having individually illuminable sections whereby the illuminated display of said sign may be changed, electric lamps on said sections, a source of electric current for said lamps, means including a contact maker and breaker in the circuits of said lamps and source for periodically illuminating certain of said sections in a predetermined order to provide a periodically changing illuminated sign, and means provided by the flight of said aeroplane for actuating said periodic changing means.

11. In combination with an aeroplane, an illuminable sign carried thereby comprising a plurality of frames having individually illuminable sections whereby the illuminated display of said sign may be changed, electric lamps on said sections, a source of electric current for said lamps, means for periodically illuminating certain of said sections in a predetermined order to provide a changing illuminated sign, and a suction force provided by the flight of said aeroplane for actuating said periodic changing means.

12. In combination with an aeroplane, a sign supported on the under side thereof and spaced therefrom, the ends of said sign extending beyond the lateral extremities of said aeroplane and being positioned above a horizontal plane passing through the center of said sign.

13. In combination with an aeroplane having wings, a sign supported on the under side thereof and in spaced relation, said sign being of such shape as to form a dihedral angle greater than that of said wings.

14. In combination with an aeroplane having laterally extending wings, a sign supported from the under side of said wings and spaced therefrom, said sign sloping upwardly and outwardly with respect to its center and forming a dihedral angle greater than that of said wings.

15. In combination with an aeroplane having wings, a sign visible on the underside thereof, the end portions of said sign extending beyond the ends of said wings and sloping upwardly therefrom.

16. In combination with an aeroplane having laterally extending wings, a sign supported below the under side of said wings, said sign sloping upwardly and outwardly with respect to its center, and forming a dihedral angle greater than that of said wings and means on said aeroplane for periodically changing the readable characters of said sign.

17. In combination with an aeroplane, an illuminable sign carried thereby comprising a plurality of frames having individually illuminable sections whereby the illuminated display of said sign may be changed, electric lamps on said sections, a source of electric current for said lamps, and controlled continuously operating means in and actuated by the flight of the aeroplane and including a contact maker and breaker and a perforated web, for periodically illuminating certain of said sections in a predetermined order to provide a periodically changing illuminated sign while the aeroplane is in flight.

18. In combination with an aeroplane, an illuminable sign carried thereby comprising a plurality of frames having individually illuminable sections whereby the illuminated display of said sign may be changed, a source of electric current for the illumination of said sections, a contact maker and breaker in the circuit of said illuminating means, a perforated web controlling the operation of said contact maker and breaker whereby certain selected sections of said sign frames are illuminated, and controlled continuously operating means in said aeroplane for periodically shifting said web with respect to said contact maker and breaker to change the illumination of said sign.

19. In combination with an aeroplane, an illuminable sign carried thereby comprising a plurality of frames having individually illuminable sections whereby the illuminated display of said sign may be changed, a source of electric current for the illumination of said sections a contact maker and breaker in the circuit of said illuminating means, a perforated web controlling the operation of said contact maker and breaker whereby certain selected sections of said sign frames are illuminated, and means for periodically shifting said web with respect to said contact maker and breaker to change the illumination of said sign, said means comprising air actuated mechanism.

20. In combination with an aeroplane, an illuminable sign carried thereby comprising a plurality of frames having individually illuminable sections whereby the illuminated display of said sign may be changed, a source of electric current for the illumination of said sections, a contact maker and breaker in the circuit of said illuminating means, and a perforated web controlling the operation of said contact maker and breaker whereby certain selected sections of said sign frames are illuminated, and means for periodically shifting said web with respect to said contact maker and breaker to change the illumination of said sign, said means comprising air actuated mechanism, the air force for said mechanism being provided by the flight of aeroplane.

21. An electric sign comprising in combination a plurality of lamps, a source of current, a contact maker and breaker in the circuit of said lamps and source, said contact maker and breaker comprising a plurality of stationary contacts and a plurality of flexible movable contacts, said flexible contacts being movable with a wiping action into engagement with said stationary contacts, and means for so moving certain said flexible contacts into engagement with certain of said stationary contacts whereby to complete the circuit therethrough.

22. An electric sign comprising in combination a plurality of lamps, a source of current, a contact maker and breaker in the circuit of said lamps and source, said contact maker and breaker comprising a plurality of stationary contacts and a plurality of flexible movable contacts, means for wiping certain of said flexible contacts into engagement with certain of said stationary contacts whereby to complete the circuit therethrough, and means for disengaging said flexible contacts from said stationary contacts substantially simultaneously.

23. An electric sign comprising in combination a plurality of lamps, a source of current, a contact maker and breaker in the circuit of said lamps and source, said contact maker and breaker comprising a plurality of stationary contacts and a plurality of flexible movable brush contacts, said flexible contacts being movable with a wiping action into engagement with said stationary contacts, means for so moving certain of said flexible contacts into engagement with certain of said stationary contacts whereby to complete the circuit therethrough, a perforated web between said flexible and stationary contacts for controlling the engagement thereof, and means for periodically moving said web to bring a different set of perforations between said contacts.

24. An electric sign comprising in combination, a plurality of lamps, a source of current, a contact maker and breaker in the circuit of said lamps and source, said contact maker and breaker comprising a plurality of stationary contacts and a member carrying a plurality of flexible movable contacts, a web between said stationary and flexible contacts having perforations registering with certain of said stationary contacts, means for moving said flexible contact carrying member toward and along said stationary contacts to wipe certain of said flexible contacts into engagement with said registering stationary contacts, and means for disengaging said contacts by raising first one end of said flexible contact carrying member and then the other end and returning said member to normal position.

25. In combination with an aeroplane, an illuminable, changeable sign carried thereby, said sign comprising a plurality of electric lamps, a source of electric current for said lamps, a contact maker and breaker in the circuit of said source and said lamps, a perforated web cooperating with said contact maker and breaker for changing the illumination of said lamps to provide different readings, and means for operating said sign periodically by first closing said contact maker and breaker to illuminate certain of said lamps, then opening the same, and then moving said web one step whereby to change the illumination of said lamps for the next closing of said contact maker and breaker.

26. In combination with an aeroplane, an illuminable changeable sign carried thereby, said sign comprising a plurality of electric lamps, a source of electric current for said lamps, a contact maker and breaker in the circuit of said source and said lamps, a perforated web cooperating with said contact maker and breaker for changing the illumination of said lamps to provide different readings, and means for operating said sign periodically by first closing said contact maker and breaker to illuminate certain of said lamps, then opening the same, and then moving said web one step whereby to change the illumination of said lamps for the next closing of said contact maker and breaker, said operating means comprising a plurality of air actuated bellows and connections between the same and said contact maker and breaker and the web moving means.

27. In combination with an aeroplane, an illuminable, changeable sign carried thereby, said sign comprising a plurality of electric lamps, a source of electric current for said lamps, a contact maker and breaker in the circuit of said source and said lamps, a perforated web cooperating with said contact maker and breaker for changing the illumination of said lamps to provide different readings, means for operating said sign periodically by first closing said contact maker and breaker to illuminate certain of said lamps, then opening the same, and then moving said web one step whereby to change the illumination of said lamps for the next closing of said contact maker and breaker, said operating means comprising a plurality of air actuated bellows and connections between the same and said contact maker and breaker and the web moving means, and an air suction force provided by the aeroplane in flight for actuating said bellows.

28. In combination with an aeroplane, an illuminable, changeable sign carried thereby, said sign comprising a plurality of electric lamps, a source of electric current for said lamps, a contact maker and breaker in the circuit of said source and said lamps, a perforated web cooperating with said contact maker and breaker for changing the illumination of said lamps to provide different readings, means for operating said sign periodically by first closing said contact maker and breaker to illuminate certain of said lamps, then opening the same, and then moving said web one step whereby to change the illumination of said lamps for the next closing of said contact maker and breaker, said operating means comprising a plurality of air actuated bellows and connections between the same and said contact maker and breaker and the web moving means, an air suction force provided by the aeroplane in flight for actuating said bellows, and electrical means operable periodically to control the actuation of said bellows and connections by said air force.

29. In combination with an aeroplane, an illuminable, changeable sign carried thereby, said sign comprising a plurality of electric lamps, a source of electric current for said lamps, a contact maker and breaker in the circuit of said source and said lamps, a perforated web cooperating with said contact maker and breaker for changing the illumination of said lamps to provide different readings, means for operating said sign periodically by first closing said contact maker and breaker to illuminate certain of said lamps, then opening the same, and then moving said web one step whereby to change the illumination of said lamps for the next closing of said contact maker and breaker, said operating means comprising a plurality of air actuated bellows and connections between the same and said contact maker and breaker and the web moving means, an air suction force provided by the aeroplane in flight for actuating said bellows, electrical means operable periodically to control the actuation of said bellows and connections by said air force, and independent means manually operable to control said bellows actuating means.

30. An electric sign comprising in combination, a plurality of illuminable sections, a source of current, a contact maker and breaker in the circuit of said sections and source, said contact maker and breaker comprising a plurality of stationary contacts and a plurality of flexible movable brush contacts, means for wiping certain of said flexible contacts into engagement with certain of said stationary contacts, whereby to complete the circuit therethrough to selected portions of said sections, and a movable perforated web between said flexible and stationary contacts for controlling the engagement thereof.

31. An electric sign comprising in combination, a plurality of illuminable sections, a source of current, a contact maker and breaker in the circuit of said sections and source, said contact maker and breaker comprising a plurality of stationary contacts and a plurality of flexible movable brush contacts, means for wiping certain of said flexible contacts into engagement with certain of said stationary contacts, whereby to complete the circuit therethrough to selected portions of said sections, a movable perforated web responsive to atmospheric changes between said flexible and stationary contacts for controlling the engagement thereof, a roller for supporting and moving said web, said roller having adjustable sprocket ends for engaging perforations in said web for moving the same, and said ends being connected by a material similarly responsive to atmospheric changes whereby expansion and contraction of said web and sprocket connecting means by atmospheric conditions will be the same and said sprocket ends adjusted accordingly.

EDWIN A. LINK, Jr.